(Specimens.)

J. FERGUSON.
DECORATIVE GLASSWARE.

No. 305,380.        Patented Sept. 16, 1884.

Witnesses                    Inventor.
John F. C. Prinkert         James Ferguson.
Arthur Zipperlen.       by Crosby & Gregory
                                        attys.

UNITED STATES PATENT OFFICE.

JAMES FERGUSON, OF BOSTON, MASSACHUSETTS.

DECORATIVE GLASSWARE.

SPECIFICATION forming part of Letters Patent No. 305,380, dated September 16, 1884.

Application filed July 19, 1884. (Specimens.)

*To all whom it may concern:*

Be it known that I, JAMES FERGUSON, of Boston, county of Suffolk, State of Massachusetts, have invented an Improvement in Decorative Glassware, of which the following description, in connection with the accompanying drawings, is a specification, like letters on the drawings representing like parts.

My invention relates to decorative glassware especially intended for mural decorations, and has for its object to produce more brilliant and pleasing effects than have been attained by materials heretofore used.

Glass having plain or corrugated or uneven surfaces has been used as a coating or veneer for walls, ceilings, and other places, and in order to produce varieties of color the glass has been painted or covered with a pigment on its unexposed surface. In such construction the glass merely constitutes a clear surface or covering for the paint, and is in reality nothing more than a thick clear varnish for the paint, and as all pigments are comparatively dull or lacking in luster or reflecting power no great brilliancy of effect or splendor can be produced.

My invention consists in the employment of transparent or semi-transparent glass having the desired color in the glass itself, and preferably having an uneven corrugated or irregular surface, and the unexposed surface of the glass is coated with a metal giving almost perfect reflection, so that light falling on the said glass is reflected back through the glass and tinged with the color thereof. The colors of colored glass are far more brilliant and transparent than those of any pigments, and as the metal surface reflects nearly the whole of the light, the utmost possible brilliancy of effect is produced, far greater than that produced by a glazed pigment, which absorbs a large portion of the light, and reflects but a small amount of light of comparatively dull or lusterless coloring.

Figure 1:
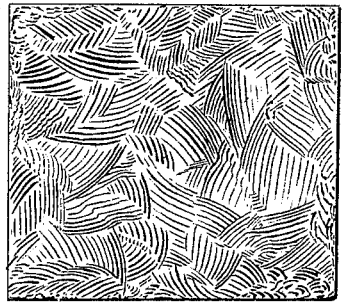
Figure 2:

Figure 1 is a face view, and Fig. 2 an edge view, of a piece of decorative glass embodying this invention.

In carrying out my invention I take plates or pieces *a* of glass of any of the countless varieties known to the art, it being chosen with reference to the color and effect desired. Transparent glass of uniform color, or having variegated colors, or glass which is mainly clear or uncolored having one or more colors streaked or blended into it, or glass of the variety known as opalescent, being semi-transparent and of uniform or variegated tint, may all be used with good effect, and for most purposes glass having an uneven surface, such as produced by rolling, or having a deeply-corrugated surface, is most desirable, as it breaks up or disperses the light. The colored glass having the desired tint or tints is coated on its back or unexposed surface with metal, (indicated at *b*,) so that light falling on the glass and passing through it is reflected back through the glass and tinged with the color thereof.

The metal may be deposited on or applied to the glass in any suitable manner, various methods being known in the art. The specimen represented in the drawings has its irregular surface or back produced by fracturing or chipping off pieces of the glass, producing what is known as "shivered glass," which breaks up the light, giving great brilliancy of effect, and where the greatest amount of light is desired without coloring. Clear glass shivered and coated with silver is most desirable.

Various different metals may be used for the reflecting-surface, according to the quality of work and effect that may be desired.

I claim—

1. As an improved article of manufacture, colored glass having an uneven or irregular surface coated with metal, the same to be used for decorative purposes, substantially as described.

2. Transparent shivered glass, or glass having one of its sides fractured or chipped, combined with a metallic coating on the said fractured surface, substantially as and for the purpose described.

In testimony whereof I have signed my name to this specification in the presence of two subscribing witnesses.

JAMES FERGUSON.

Witnesses:
JOS. P. LIVERMORE,
W. H. SIGSTON.